US006340230B1

(12) United States Patent
Bryars et al.

(10) Patent No.: US 6,340,230 B1
(45) Date of Patent: Jan. 22, 2002

(54) METHOD OF USING A RETARDER PLATE TO IMPROVE CONTRAST IN A REFLECTIVE IMAGING SYSTEM

(75) Inventors: Brett J. Bryars; Michael R. Greenberg; Sean Sullivan, all of Santa Rosa, CA (US)

(73) Assignee: Optical Coating Laboratory, Inc., Santa Rosa, CA (US)

( * ) Notice: Subject to any disclaimer, the term of this patent is extended or adjusted under 35 U.S.C. 154(b) by 0 days.

(21) Appl. No.: 09/523,370

(22) Filed: Mar. 10, 2000

(51) Int. Cl.[7] .............................................. G03B 21/00
(52) U.S. Cl. .............................. 353/31; 353/20; 349/18
(58) Field of Search .............................. 353/20, 31, 33, 353/34, 37, 69; 349/7, 8, 9, 18; 359/493, 494, 495

(56) References Cited

U.S. PATENT DOCUMENTS

| 5,327,270 | A | | 7/1994 | Miyatake |
| 5,459,593 | A | | 10/1995 | Ootaki |
| 5,576,854 | A | | 11/1996 | Schmidt |
| 5,594,591 | A | | 1/1997 | Yamamoto et al. |
| 5,829,854 | A | * | 11/1998 | Jones ........................... 353/33 |
| 5,986,815 | A | | 11/1999 | Bryars |
| 6,019,474 | A | | 2/2000 | Doany et al. |
| 6,052,231 | A | | 4/2000 | Rosenbluth |
| 6,123,424 | A | * | 9/2000 | Hayashi et al. ................ 353/20 |
| 6,172,816 | B1 | * | 1/2001 | Tadic-Galeb et al. ........ 359/649 |
| 6,179,423 | B1 | * | 1/2001 | Kato et al. ..................... 353/31 |
| 6,250,762 | B1 | * | 6/2001 | Kuijper ........................ 353/20 |

OTHER PUBLICATIONS

Bennett, Handbook of Optics, 1995, chap. 3.52, vol. II, McGraw–Hill, Inc., USA.

* cited by examiner

Primary Examiner—William Dowling
(74) Attorney, Agent, or Firm—Edward S. Sherma

(57) ABSTRACT

Methods and apparatus for enhancing the performance of a reflective liquid crystal display system. The high-contrast color splitting prism system utilizes a "double-passed" prism assembly. Polarized light enters the prism assembly, is color-split and emitted as separate colors to spatial light modulators which reflect each color in accordance with a desired image. The reflective light is passed, once again, through the prism assembly where the separate colors converge and propagate to a projection lens for display of the image on a screen. A waveplate retarder is positioned between the liquid crystal display and the polarizing element. The waveplate retarder is tilted with respect to the optical axis to eliminate the deleterious effects of the Fresnel reflections at the interfaces of the waveplate retarder.

22 Claims, 8 Drawing Sheets

METHOD OF USING A RETARDER PLATE TO IMPROVE CONTRAST IN A REFLECTIVE IMAGING SYSTEM

BACKGROUND OF THE INVENTION

1. The Field of the Invention

The present invention is directed to systems, methods and apparatus for achieving enhanced contrast in reflective imaging systems, such as those utilizing reflective liquid crystal display imagers and color splitting devices, such as Philips prisms. The invention maximizes the transmission of light polarized in a certain direction while minimizing the transmission of light polarized in another direction, thereby achieving a high contrast ratio which significantly improves the final image quality.

2. The Relevant Technology

Liquid crystal displays are commonly used as spatial light modulators in projection imaging systems. A reflecting type of liquid crystal panel (which is also known as a liquid crystal light valve) comprises an array of pixels, which when activated works by reflecting incident light while simultaneously rotating the polarization vector of the light by 90 degrees, typically when a voltage or signal is applied to an individual pixel. Thus the signal or image information is contained in the light which is of a particular polarization. If the liquid crystal imager is not activated, then those particular pixels of the liquid crystal imager are in the "off" state, and the light which is reflected from them will have no rotation of the polarization state. The signals from these "off" pixels should correspond to dark spots in the final image. One aspect of the quality of an image in such a system is measured through a parameter known as the contrast ratio, which is defined as the ratio of the light transmitted through the system in the "on" state divided by the amount of light transmitted in the "off" state. The higher the contrast ratio, the better the overall quality of the image.

Loss of contrast through a non-polarizing color splitting device such as a Philips prism results from a combination of the geometrical effect from skew rays as well as diattenuation and phase differences in the coatings of reflective and total internal reflection surfaces.

The geometrical effects of a polarizing beam splitter have been described in detail in Ootaki (U.S. Pat. No. 5,459,593) and Miyatake (U.S. Pat. No. 5,327,270), the disclosures of which are hereby incorporated by reference, as follows below. These geometrical effects are a pure rotation of the input linearly polarized light by a polarizing beam splitter. Rear projection imaging systems typically have a contrast ratios of not less than 50:1 as suggested in Ootaki, in the plots showing a 2% dark level (100%/2%=50:1).

In the Ootaki patent, white light from a halide or xenon lamp is incident at an angle of approximately 45 degrees onto a polarizing cubic beam splitter. The polarizing cubic beam splitter reflects light which is of s-polarization and transmits light which is of p-polarization (where s-polarization refers to light which has its polarization vector perpendicular to the direction of propagation, while p-polarization refers to light which has its polarization vector lying in the plane of propagation). The light which is of s-polarization is reflected by the polarizing beam splitter towards a dichroic mirror. The dichroic mirror in the Ootaki patent is designed in such a way as to reflect the s-polarized light which is of one color while transmitting the other color components of the beam. The use of more than one dichroic mirror results in a separation of the incident white light into various color channels. In a typical imaging system, two dichroic mirrors are sufficient to separate incident white light into red, green, and blue color channels. The color selectivity of the dichroic mirror is achieved by the placement of specific optical coatings upon the mirror, which is a well known technique in the art for color separation.

A limitation in the quality of the performance of this system originates from the rotation of the plane of polarization in the polarizing prism for incident light rays which are not in an eigenstate. Since this rotation is independent of the state of the image generating pixels it results in a leakage of light in the "off" state pixels which degrades the image contrast. The optical coatings on the dichroic mirror were designed to compensate for rotation of the polarization state.

Miyatake discloses a similar approach to compensate for the polarizing beam splitter. The approach disclosed in the Miyatake patent is to compensate for the polarizing beam splitter with a quarter waveplate in the optical path between the reflecting type liquid crystal device and the polarizing beam splitter. In Miyatake the quarter waveplate retarder was aligned with its plane perpendicular to the optical axis and is laminated to the terminal surface of polarizing beam splitters to reduce the Fresnel reflection at its interface with the prism. However this patent does not teach or consider phase differences that may occur in a color splitting device, such as a tilted dichroic mirror or a Philips prism.

In U.S. Pat. No. 5,594,591 which issued to Yamamoto et al.; the disclosure of which is hereby incorporated by reference, the inventor has attempted to solve the same problem in a projection display wherein the color separation element is a Philips prism. The Philips prism disclosed in the Yamamoto et al. patent employs optical coatings upon the faces of the Philips prism for color separation and an anti-reflection coating on the incident prism faces, which also form a total internal reflection (TIR)surfaces. Yamamoto et al. also assert that the optical coatings on the TIR surfaces, which comprise alternating layers of $SiO_2$ and $TiO_2$, have a phase control function. The dichroic optical coatings used for color separation cooperate with the anti-reflection coating layers at the TIR surface in achieving this phase control function; which combined the 90 degree phase difference at the TIR surface corrects for the image degradation contributed by the polarizing beam splitter.

When utilizing a quarterwave compensating plate, or quarter waveplate retarder, in the optical path between each of the three liquid crystal light valves and the Philips prism in such a reflective imaging systems, the contrast ratio is improved by ensuring that the black level is closer to being completely black. While use of quarter waveplates in such a system proposes a means for the correction of rotations in the polarization vector due to the polarizing beam splitter, it does not address the undesired ellipticity and additional rotation added by the color splitter.

A quarter wave compensation plate, or waveplate retarder is also used in U.S. Pat. No. 5,576,854 issued to Schmidt et al., the disclosure of which is hereby incorporated by reference. The Schmidt et al. patent was developed for monochromatic systems and does not address the issue of color imaging. The system disclosed in Schmidt et al. works in a manner similar to the system disclosed in Miyatake, as previously described, namely by the reduction of off-axis depolarization induced by geometric effects when the light encounters the polarizing beam splitter. Schmidt et al. specifically mentions using a waveplate with a value of retardance equal to 0.25 to compensate for the off-axis polarization components generated by the polarizing beam splitter. However, Schmidt et al. additionally suggests that an additional retardance of 0.02 be included to compensate for the unwanted polarization shifts generated by the thermally induced birefringence of the liquid crystal light valve, an effect which results in the dark state being lighter than desired. Accordingly, Schmidt et al. suggests that in monochromatic imaging systems the waveplate compensator have a total retardance value equal to 0.27 to compensate for the additional retardance, or phase delays between components due to the thermally induced birefringence in the LCLV.

In commonly assigned U.S. Pat. No. 5,986,815, incorporated herein by reference, Bryars teaches methods and apparatus for correcting undesired depolarization of color splitters through the use of uniquely designed waveplate retarders. The waveplate retarders are disposed to optimally maximize the transmission of light polarized in the "on state" while minimizing the transmission of light polarized in the "off state", for each color of the display system, thereby achieving a high contrast ratio which significantly improves the final image quality.

While the use of waveplate retarders can provide significant improvements to the contrast of projection display imaging systems, the incorporation of the retarder in the optical system introduces complications which must be overcome. Foremost among these is the Fresnel reflection that occurs as an interface between the retarder and air or between the retarder and glass surfaces to which the retarder is bonded. Although the Fresnel reflection can be significantly reduced by application of an anti-reflection coating to one or both surfaces of a plano, optical component, such as a waveplate retarder, the Fresnel can only be reduced to zero at a single or narrow band of wavelengths. The birefringence of a waveplate retarder introduces an additional complication to reducing the Fresnel reflection to zero. The anti-reflection coating can only be perfectly effective for one of the two refractive indices which corresponds to either the fast or slow axis of the birefringent material which comprises the retarder plate.

Similarly, lamination of the retarder plate to another optical component having a similar refractive index to the birefringent material will only be completely effective for light waves propagating in a direction where the effective index of the retarder perfectly matches with the refractive index of the substrate.

Additionally, waveplate retarders are commercially available in discrete thickness', which will correspond to a quarter wave of phase retardance for light of a particular wavelength. The full benefits of the teachings of Bryars would require the manufacture of a custom waveplate retarder for each of the three color channels of a color display system. While waveplate retarders can be manufactured at any value of retardance, this results in increased complexity and logistics of manufacturing increasing cost.

It would be substantially beneficial to identify systems, methods and apparatus for further improving the contrast of projection display systems. More specifically, it would be a significant improvement in the art to minimize and correct for the rotations and ellipticity which occur in such systems that impair the contrast ratio by generating unwanted depolarization and contributing to light leakage in the "off" states. It would be beneficial to utilize commercially available and cost-effective waveplate retarders in a manner in which the Fresnel reflection could be readily eliminated without significant cost or complexity in manufacturing.

SUMMARY AND OBJECTS OF THE INVENTION

We have discovered that the conventional means for reducing the Fresnel reflection from a waveplate retarder is unsatisfactory in that an unmodulated reflected signal from a waveplate retarder associated with a particular color channel signal may ultimately degrade the contrast of a different color channel. This degradation was not only unexpected, but of a surprisingly significant magnitude for certain color channels in specific system configurations. Having developed a premise or theory for this contrast degradation, a further objective was then identified as the complete elimination of the Fresnel reflection. The objective of complete elimination of the Fresnel reflection in a waveplate retarder has heretofore been unappreciated among those skilled in art.

It is a further objective of the invention to completely eliminate the Fresnel reflection in a cost-effective manner.

It is a further objective of the invention to utilize readily available waveplate retarders of discrete thickness'.

It is a further objective of the invention to reduce the complexity and cost of assembling a projection display optical system with a waveplate retarder.

These and other objectives and features of the present invention will become more fully apparent from the following description and appended claims, or may be learned by the practice of the invention as set forth hereinafter.

Although one aspect of the invention is directed to waveplate retarders having values which are uniquely optimized by identifying and minimizing particular polarization attributes, other aspects are also beneficially directed towards conventional quarterwave plates.

The waveplate retarders are utilized in reflective imaging systems wherein light is "double-passed" through the optical paths of the system. The optical paths can be summarized as follows: light incident on a polarizing element is polarized to a first polarization state and then enters a color separation element typically a prism assembly. In the prism assembly, the polarized light undergoes color separation through the use of dichroic and reflective coatings on selected surfaces. The separate colors are emitted from the prism assembly to spatial light modulators, typically liquid crystal light valves, which change the polarization state of the reflected light in accordance with a desired image. The reflected light is passed, once again, through the prism assembly where the separate colors are recombined and the diverging light is emitted to a projection lens for display of the image on a screen.

The deleterious effects of the Fresnel reflection from the waveplate retarder on image contrast is eliminated by tilting the waveplate retarder so that its plane is not perpendicular to the optical axis it intersects. The reflected signal from the tilted retarder aligned in a first color channel is directed away from the entrance pupil of image forming optics (projection lens) corresponding to the other color channels so that the portion of the input signal from light source that is reflected by the waveplate retarder does not become a source of background noise decreasing the contrast and/or dark state color neutrality of the system. More specifically, when a waveplate retarder reflects green light from the light source, this reflected light is not redirected back to the entrance pupil of the image forming optics (projection lens) for either the red or blue color channel. While the waveplate retarder may only reflect from about 4% to about 0.1% percent of the input light this is a significant value when compared to the "off" state signal of the system. This is especially significant for the red and blue signal channels when the unmodulated signal is green light. The red or blue color channels will then suffer a substantial degradation in the color purity and contrast due to the much greater sensitivity of human vision to green light.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention is directed to systems, methods and apparatus for improving the contrast ratio of reflective imaging systems, particularly those which utilize a color separation device, or color splitter. More particularly, the present invention is directed to methods and apparatus for correcting undesired depolarization of light through polarizing components and color splitters. The waveplate retarder maximizes the transmission of light polarized in the "on state" while minimizing the transmission of light polarized in the "off state", thereby achieving a high contrast ratio which significantly improves the final image quality. The waveplate retarder is disposed so that the plane comprising the fast and slow optical axis of the waveplate retarder is not perpendicular to the optical axis to obtain the optimum compensation and/or eliminate the Fresnel reflection at one or more of its interfaces with either a rarified or condensed substance.

Figure 1:
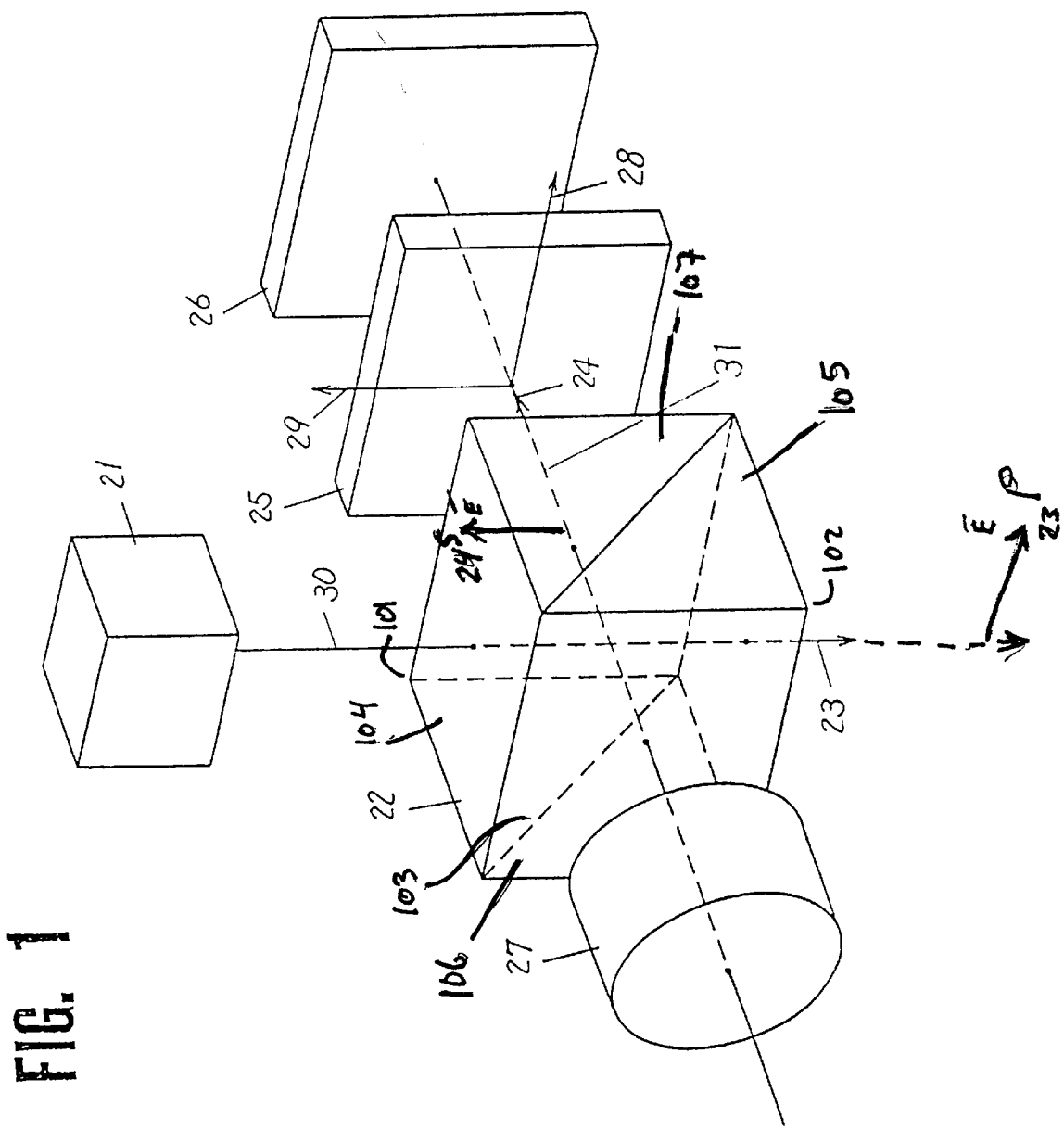
FIG. 1 depicts a schematic representation of a prior art reflective imaging system utilizing a quarter waveplate retarder.

FIG. 1 is a perspective view showing the arrangement of the prior art light valve image projection system of Miyatake. A polarizing beam splitter apparatus comprises a polarizing cubic beam splitter 22 and a quarter wave plate 25. The polarizing beam splitter 22 comprises a pair of prisms 101 and 102, and an optical, multi-layer interference coating 103 interposed between the pair of prisms 101 and 102. The polarizing beam splitter has four facets 104, 105, 106 and 107. Among the four facets, two facets 104 and 105 are parallel to each other and perpendicular to the first optical axis 30, and the remaining two facets 106 and 107 are parallel to each other and perpendicular to the second optical axis 31. The quarter wave plate 25 has two facets each of which is perpendicular to the second optical axis 31, and has a fast axis 28 and a slow axis 29 both of which are perpendicular to each other and perpendicular to the second optical axis 31. The light 108 thus output from the light source 21 is entered along the first optical axis 30 into the polarizing beam splitter 22 for separating it at the optical coating 103 into a P polarized component 23 to be passed straight and an S polarized component 24 to be reflected, along the second optical axis 31 of which, the S polarized component 24 passes through the quarter wave plate 25 to a liquid crystal panel 26 which is perpendicular to the second optical axis 31. The light reflected from the liquid crystal panel 26 passes through the quarter wave plate 25 to enter into the polarizing beam splitter 22. Out of the light thus entered, a light to be passed straight through the polarizing beam splitter arrives on a projection screen after passing through the projection lens 27. An optical axis of the projection lens 27 is either the same as or parallel to the second optical axis 31. The quarter wave plate 25 is arranged so that either the fast axis 28 or the slow axis 29 thereof is perpendicular to the plane containing both the first incident optical axis 30 and the second optical axis 31 of the polarizing beam splitter 22.

Figure 2:
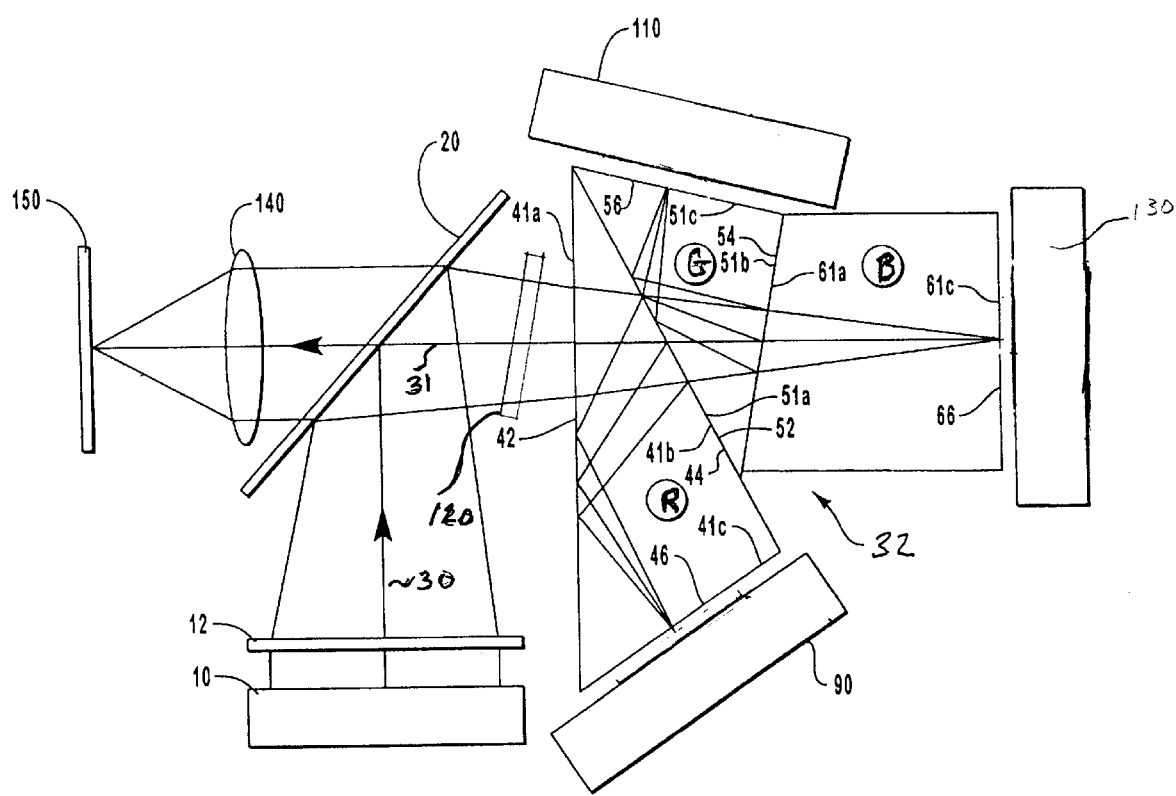
FIG. 2 depicts a schematic representation of a first embodiment of the inventive reflective imaging system utilizing one or more waveplate retarders.

FIG. 2 depicts a first embodiment of the present invention which improves the contrast ratio of a Philips prism assembly used in a reflective LCD rear projection system. FIG. 2 accordingly illustrates the components and light ray paths in the plane formed by the first, 30, and second, 31, optical axis respectively. Although the embodiment shown in FIG. 2 is presented in the context of a color reflective liquid crystal light valve, or LCD, system using a Philips prism and plate polarizing beamsplitter, it will be appreciated that this is an example which is illustrative and not limiting.

In a color display system a color separation device, or color splitter (for example a Philips prism) is located in the optical path after the polarizing device so that three separate color beams emanate from the color separation device, each beam illuminating a separate spatial light modulator thus generating a separate monochromatic image for each color. Accordingly, if a polarized component of light, such as s-polarized light, initially enters a color splitter, the light is returned to the color splitter in the "on state" as three primary color lights which are p-polarized. The color splitter then outputs a divergent cone of p-polarized light which passes through the polarizing element. That is the three color images, having been recombined in the color separation element into a single beam of modulated light, is projected to a viewing screen.

Conventional color splitters virtually always introduce some depolarization into the transmitted light due to geometrical and thin film coating effects. When transmitted by the color splitter, this portion of the light has polarization properties different than the desired polarization state and, thus, the presence of this light decreases the contrast ratio of the reflective imaging system. The contrast ratio for each color is determined by dividing the transmitted light intensity having the selected polarization state, which corresponds to the "on" state of the liquid crystal light valve, by the amount of light transmitted which is in the other state of polarization, corresponding to the "off" state. The contrast ratio of the light from a reflective imaging system is a measure of the purity of the polarization state of the transmitted light. The higher the contrast ratio, the better the overall quality of the image.

In accordance with the systems, methods and apparatus of the present invention, the contrast ratio of a reflective imaging system is enhanced with a waveplate retarder positioned to intercept light being transmitted from the polarizing element to the spatial light modulator and light being reflected from the spatial light modulator to be inputted for the second time into the polarizing element. The waveplate retarder is formed from a material and has thickness' which are selected with reference to minimizing particular polarization attributes and is oriented with respect to the second optical axis to minimize any degradation in contrast resulting from the Fresnel reflection at one or more interfaces of the waveplate retarder. The details related to the waveplate retarder are set forth hereinbelow after an exemplary embodiment of a reflecting imaging system of the present invention is described.

In FIG. 2 the waveplate retarder 120 is disposed between prism R and polarizing beam splitter 20. The system receives input illumination from a light source 10, which may typically be white light from a source such as a xenon, metal halide or tungsten lamp and the like. Light source 10 is an example of a light source means for providing light. The light from light source 10 is incident upon a polarizing beamsplitter 20. As shown, the light is preferably directed to the polarizing beam splitter 20 as convergent light and then to a Philips type of prism assembly 32. It is also possible to have a light source directing light to a polarizing beam splitter as a collimated beam which then passes through a convergent lens (not shown) located between polarizing beam splitter 20 and Philips prism 32. Such a lens is an example of convergent lens means for converging light.

Polarizing beam splitter 20 is an example of a polarizer or a polarizing means for polarizing light such that a first polarized component of light in a first polarization state is transmitted. Another example of a suitable polarizing means is a polarizing cubic beam splitter. Polarizing beam splitter 20 transmits light of one type of polarization (either s-or p-polarized light; for the purpose of example, let the light in this case be of p-polarization), while reflecting light of the other type of polarization (s-polarized in this example) into a direction 90° with respect to the direction of incidence. S-polarized light refers to light which has its polarization vector perpendicular to the plane of incidence; whereas p-polarized light refers to light which has its polarization vector lying in the plane of incidence. The s-polarized light is reflected into Philips prism 32.

The Philips prism, also known as a plumbicon prism assembly, is an example of a color splitter or color splitting means for separating a first polarized component of light into three primary color lights. Other examples of color splitting means include beamsplitter cubes, X-prisms, L-prisms and flat, tilted plate dichroic mirrors, as well as alternative configuration of plumbicon prisms such as those disclosed in copending and commonly assigned U.S. patent application having Ser. No. 09/414,047, filed on Oct. 6, 1999, which is incorporated herein by reference. Persons of skill in the art will appreciate, however, that the methods and apparatus of the present invention can also be applied to color splitters having residual phase difference and diattenuation, such as a color splitter utilizing antireflection or dichroic coatings having a non-zero but uniform phase difference across the spectral region of interest. Since other color splitters are also suitable for achieving the separation of the incident white light into separate color channels, the Philips prism should not be construed as limiting.

Philips prism 32 comprises a first triangular prism R, a second triangular prism G and third quadrangular prism B. Each prism is preferably formed from solid glass. Philips prism 32 is configured as a conventional Philips prism to orient the red, green and blue light channels respectively through prisms R, G and B. However, the Philips prism may utilize less conventional dichroic coating configurations such that the red, green and blue light channels are not respectively directed through prisms R, G and B.

Light enters into first triangular prism R, preferably at normal incidence, through incident surface 41a. Incident surface 41a is preferably coated with an antireflection coating 42. The incident beam travels through the prism R until it encounters splitting surface 41b, which is coated with a dichroic coating 44. These types of dichroic optical coatings are known in the art, and serve the purpose of reflecting light of one predetermined wavelength or color (red, for example) while transmitting light of all other colors (green and blue, for example). If the dichroic coating 44 on reflecting surface 41b is made such that it reflects red light, then the red light will be reflected at an angle towards incident surface 41a. The red light undergoes total internal reflection at surface 41a after which it passes out of prism R through exit surface 41c, which is preferably coated with an antireflection coating 46 on the exterior surface.

Second triangular prism G has an incident surface 51a, a reflecting surface 51b and an exit surface 51c. Incident surface 51a of second triangular prism G is disposed adjacent to reflecting surface 41b of first triangular prism R and is air spaced from this surface. The green and blue light transmitted through surface 41b and dichroic coating 44 passes through a small air space and then enters second triangular prism through incident surface 51a. Incident surface 51a is preferably coated with an antireflection coating 52. A dichroic coating 54 is formed on reflecting surface 5 lb for reflecting the green component of the light and for transmitting the blue component of the light. The reflected green light is then directed to 51a where it undergoes total internal reflection and then passes out of prism G through surface 51c which is preferably coated with an anti-reflection coating 56. The third quadrangular prism B has an incident surface 61a and an exit surface 61c. The incident surface 61a is mounted on reflecting surface 51b of second triangular prism G so that the blue component of light transmitted through dichroic coating 54 enters third quadrangular prism B through incident surface 61a and then exits via surface 61c which is preferably coated with an anti-reflection coating 66.

Waveplate retarder 120 is preferably tilted from normal incidence with the second such that the incidence is greater than 0 degrees. The angle of incidence is defined as the angle between the vector normal to the plane of the retarder and the incident light waves. The angle of incidence is therefore about 1 to 45 degrees, preferably about 5 to 25 degrees, more preferably from about 7 to 15 degrees.

The waveplate retarders are composed of a birefringent material, usually an anisotropic crystal such as quartz, calcite, or mica; however, certain types of organic polymeric plastics which have different indices of refraction for different crystallographic axis are also suitable.

A preferred form of a waveplate compensating material is stretched organic polymer film due to its low cost and ease of obtaining the film with different retardation values. However, such films typically have a surface that is largely unsuitable in this application since it results in image distortion unless the resulting compensator is attached to the color splitting means, such as the exit surfaces of the prism, and is also substantially separated from the image plane.

The waveplate retarder may also be liquid crystal materials in the form of a typical liquid crystal or LCD cell. Additionally, a liquid crystal material can be transformed into a solid after the appropriate molecular orientation has been achieved. This can be done with a polymer having liquid crystal side chains or photopolymerizable liquid crystal molecules. The LCD cell is contained between two opposing surfaces such as two opposing plates.

Each of the three colored cones of light is incident upon its respective reflective imager 90, 110 and 130 and the light from the liquid crystal light valves will be reflected back through the waveplate retarder 120 and will contain the optical signal information which will form the final image for viewing upon a screen 150. Some of the pixels of the spatial light modulator or imaging liquid crystal light valves may be on and some off, in accordance with the image. Light which is reflected from the pixels which are on will have their polarization shifted by 90 degrees by the liquid crystal light valves or LCLV, while light reflected from the pixels in the "off" state will not experience any change in polarization state due to the LCLV. Such liquid crystal light valves are examples of spatial light modulators or reflective imager means for modulating a polarization state for each of the three primary color lights and for reflecting or redirecting the red light, the green light and the blue light thus modulated back into the color splitting means. After reflected light from the pixels of each LCLV in the "off" state traverses back, the light passes through the corresponding waveplate compensator 120 which is designed to effectively compensate for any rotations and ellipticity in the polarization vector after double passing through the component. Accordingly, the contrast ratio in these liquid crystal imaging systems is enhanced by reducing the light leakage in the "off" states of the image.

The optical paths of "double-passing" the light in the system shown in FIG. 2 can be summarized as follows: light passes through a polarizing beam splitter 20 to polarize the light to a first polarization state and then enters the prism assembly 32. In prism 32, the polarized light undergoes color-splitting through the use of dichroic and antireflective coatings on selected surfaces. The separate colors are emitted from the prism assembly to spatial light modulators 90, 110, and 130 which change the polarization state of the reflected light in accordance with a desired image. The reflected light is passed, once again, through prism assembly 32 where the separate colors are recombined and the divergent light is emitted to a projection lens 140 for display of the image on a screen 150. Any conventional projection lens may be utilized. Such lenses are examples of projection lens means for projecting an image onto a screen.

Previous systems have utilized a quarter waveplate to correct for the rotation introduced by a polarizing beam splitter. However, quarter waveplates are particularly inadequate in reflective imaging systems utilizing color splitters such as a Philips prism which is non-polarizing. The quarter waveplates have multiple dielectric surfaces and a total internal reflection surface. The polarization in such complicated systems cannot be corrected simply with a quarter waveplate as the polarization is not simply rotated. Such a complicated color splitting arrangement transmits light with a residual ellipticity and rotation of the polarization which yields unacceptable contrast without some mechanism such as the inventive waveplate retarders.

As taught by Bryars, the value of the waveplate retarder is selected to effect a predetermined phase difference to retard, and thereby substantially eliminate that portion of the "off" state from the spatial light modulator which undergoes depolarization. The contrast ratio of the reflective imaging system is greatly increased and the outputted cone of light is substantially composed of light having the selected polarization state and a high-contrast projection image is achieved.

The desired value of the waveplate retarder can be achieved by tilting an off-the shelf waveplate, i.e. one that is commonly available without custom manufacturing, from a position perpendicular to the optical axis to adjust the phase retardance, as may be required for one or more of the color channels. The retardation can be increased or decreased as described in Bennett, *Handbook of Optics*, McGraw-Hill, Inc., vol. II, chap. 3.52 (1995). Using the computation methods conventionally available and described in Bryars, one skilled in the art can calculate and determine the desired retardance value and tilt angle for a waveplate having a quarterwave retardance, or any other optical thickness, at normal incidence. In this manner, commonly available retarder material can be used for the assembly. Additionally, tilting the retarder material about its optical axis to change its value can compensate for residual depolarization that may occur during component manufacturing of the color splitters and/or reflective light valves.

Figure 3:
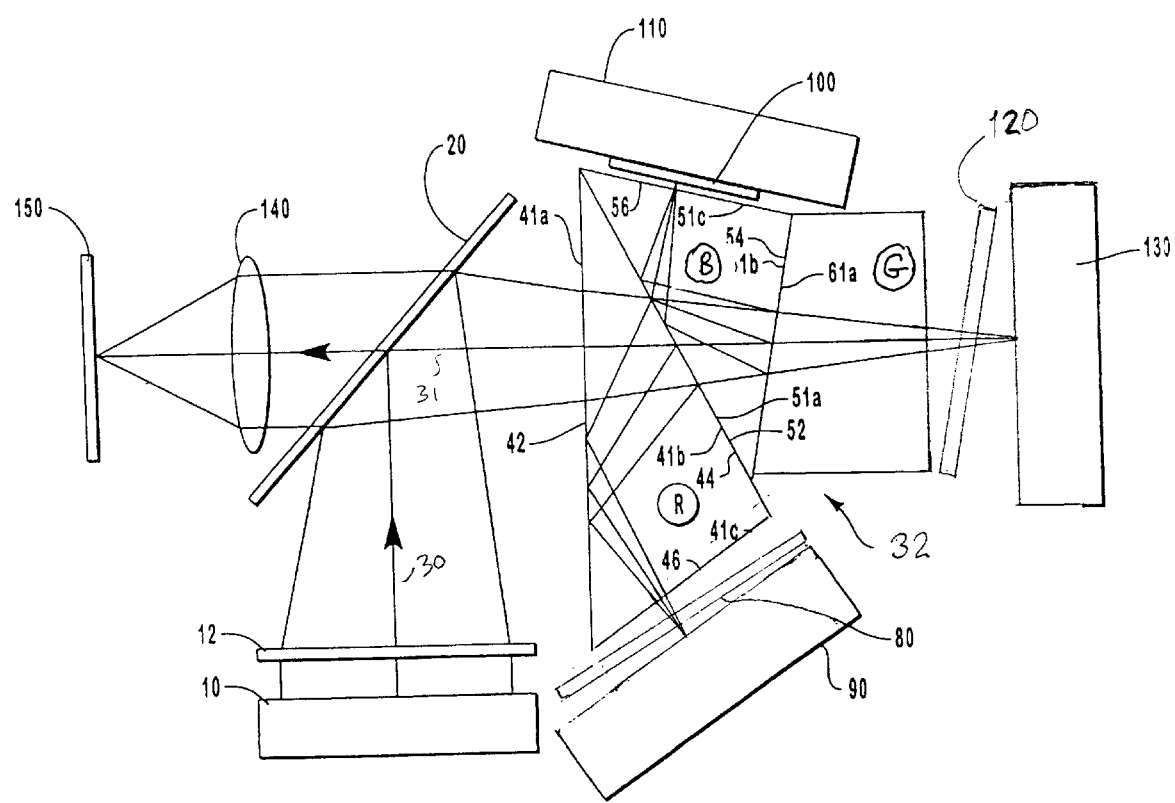
FIG. 3 is a schematic representation of a second embodiment of the effective imaging system utilizing one or more waveplate retarders

FIG. 3 is a schematic diagram of a second embodiment of the invention wherein waveplate retarder 120 and 80 are respectively disposed between the color separation device in this figure shown as prisms G and R of the Philips prism assembly 32 and the respective spatial light modulator illustrated as liquid crystal light valves 130 and 90 respectively. Waveplate retarder 120 is tilted from the second optical axis 31 by between about 1 to 45 degrees, preferably about 5 to 25 degrees, more preferably from about 7 to 15 degrees.

The use of waveplate retarders for prisms R and G is not intended to be limiting. Those skilled in the art will recognize that alternative methods of phase compensation can be deployed for either or both of the remaining color channels, as well as utilizing any of the tilted waveplate configurations disclosed herein at any one or more of the spatial light modulator locations.

The waveplates may be free standing between the spatial light modulator and the color splitting prism, or as described and illustrated with the remaining figures, or may be buried or laminated to one or more of the color separation devices.

Figure 4:
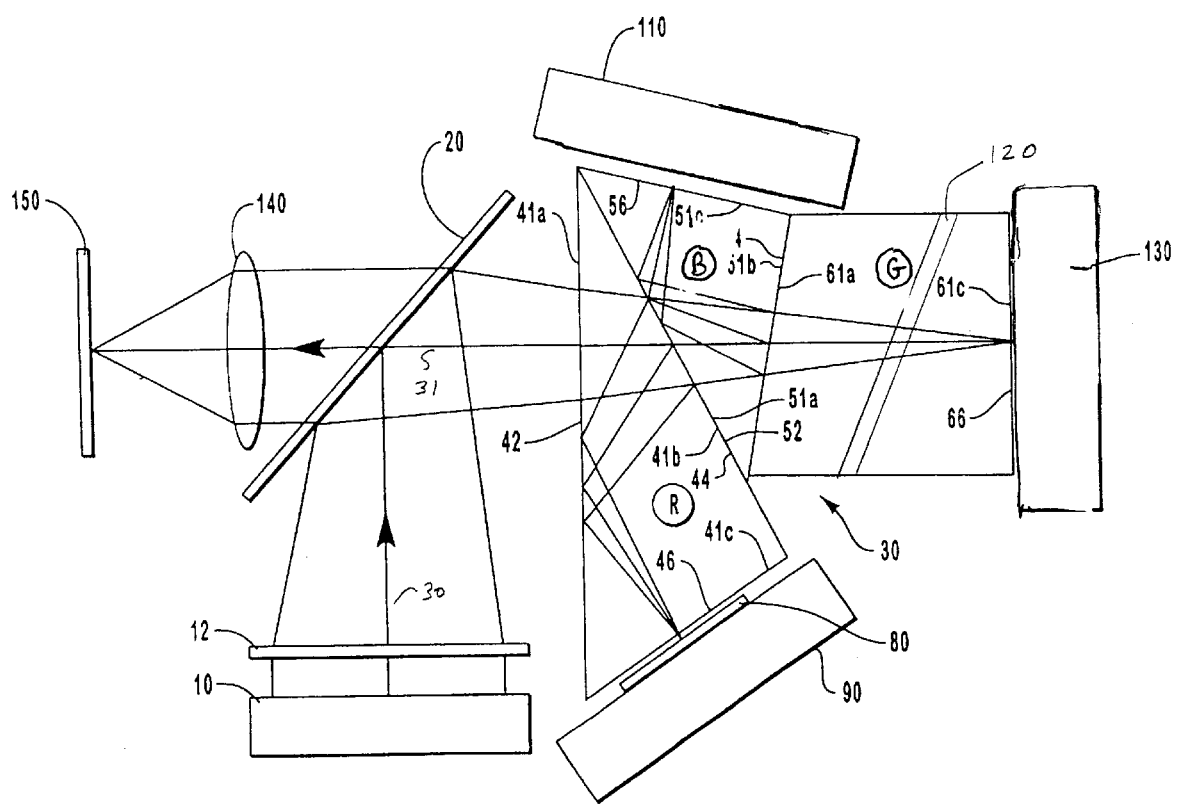
FIG. 4 is a schematic representation of a third embodiment of the effective imaging system utilizing one or more waveplate retarders
Figure 5:
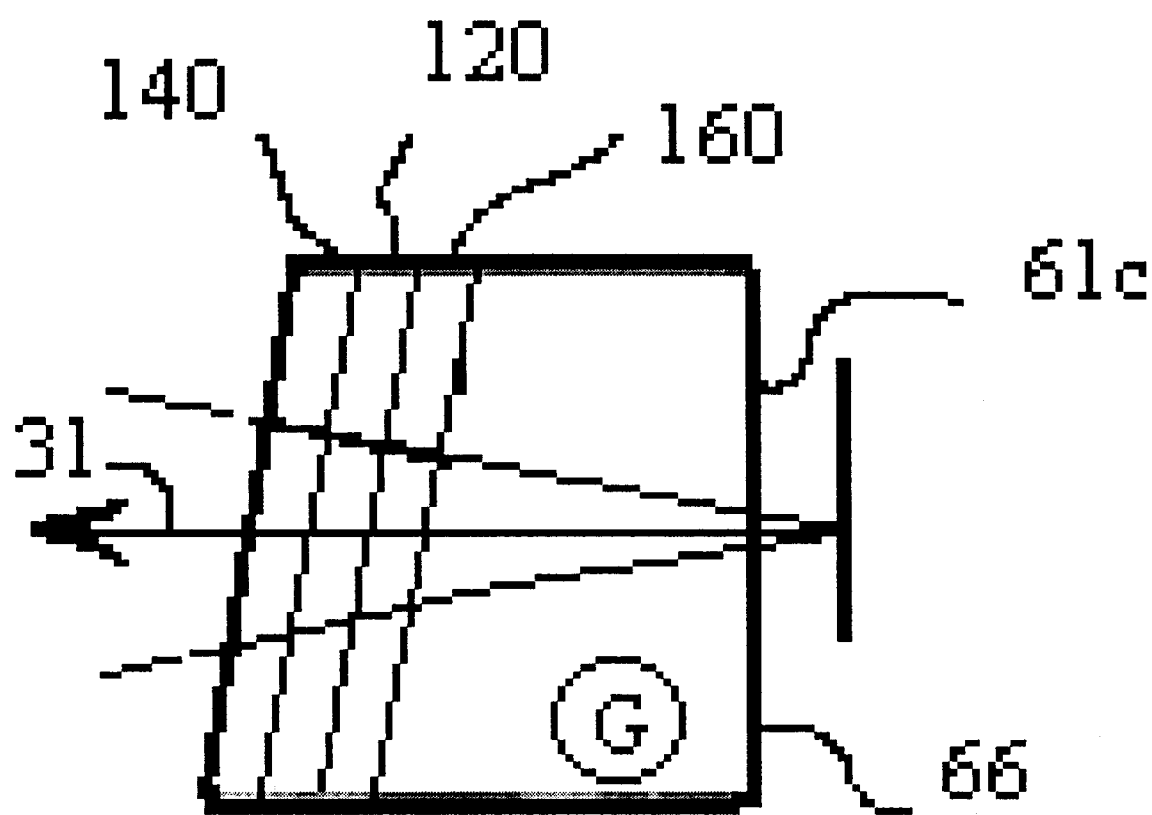
FIG. 5 is a schematic representation of a fourth embodiment of the effective imaging system utilizing one or more waveplate retarders

FIG. 4 is a schematic diagram of a third embodiment of the invention wherein waveplate retarder 120 is immersed within prism G. This embodiment simplifies placement at the desired tilt angle and eliminates the need for a separate stable mounting support when a thin retarder film comprises the waveplate retarder. This configuration, as well as that in FIG. 5, is more preferred as it reduces the deleterious effect of green light on the contrast and dark state color neutrality. Furthermore, the tilt angle can be varied considerably without increasing the spacing between the liquid crystal light valve 130 and prism G, or in the case of FIG. 2 the spacing between prism R and polarizing beam splitter 20.

FIG. 5 is a schematic diagram of a fourth embodiment of the invention wherein waveplate retarder 120 is immersed within prism G. As will be described further in example 1, the tilt angle with respect to the optical axis is determined by the angle of reflecting surface 51*b*.

As another non-limiting example, when the color separation device is a tilted dichroic mirror, such as in the optical system described by Ootaki, the waveplate may be laminated to or imbedded in the substrate supporting the multi-layer dichroic coating.

Figure 6:
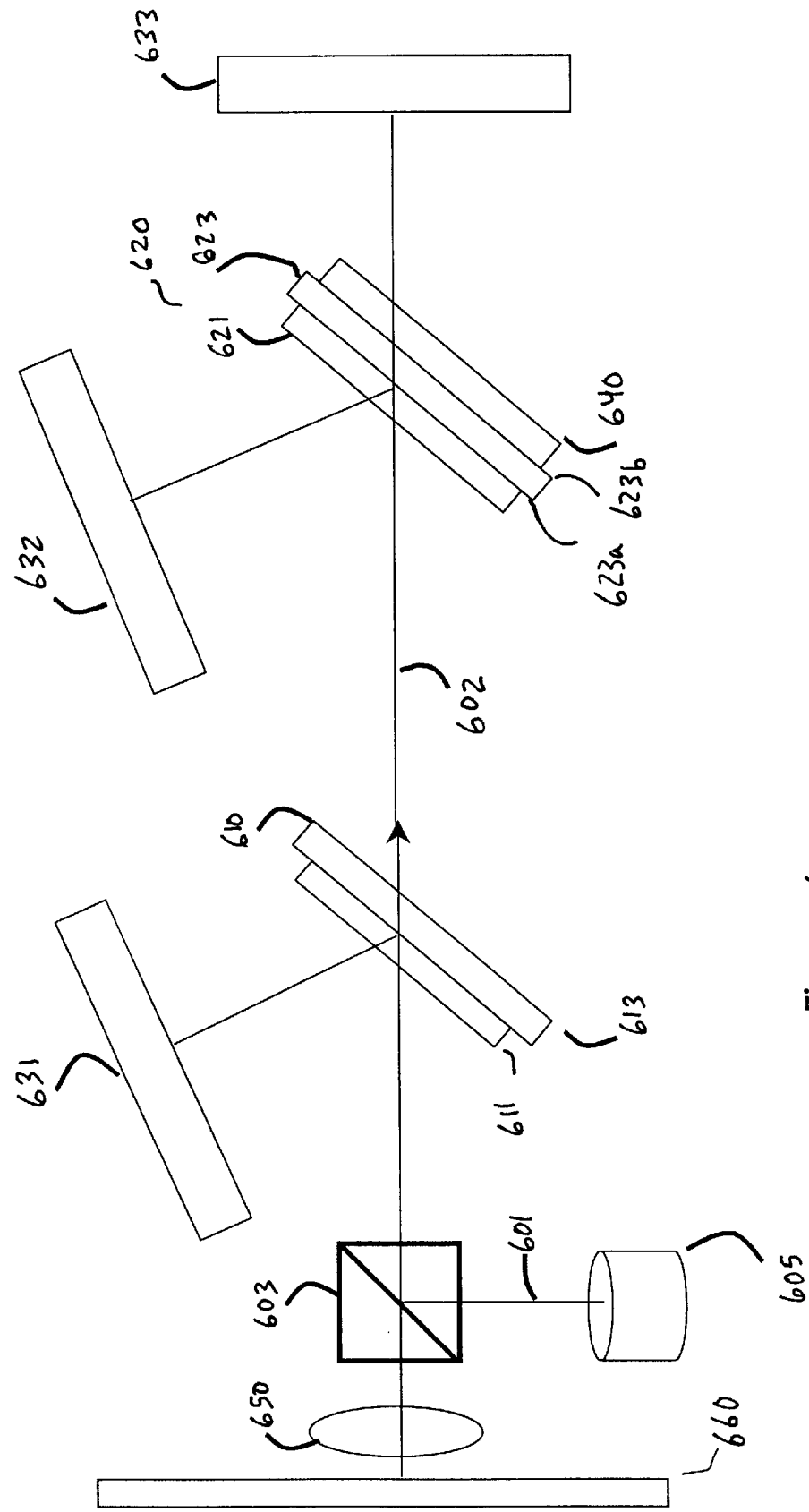
FIG. 6 is a schematic representation of a fifth embodiment of the reflective imaging system utilizing dichroic mirrors as the color separation element.

FIG. 6 illustrates another embodiment of the invention wherein the color separation element is a pair of dichroic mirrors, 610 and 620, that are tilted from normal incidence to the second optical axis 602. Each dichroic mirror comprises an optical coating, i.e. multi-layer interference coating, 611 and 621 disposed on substrates 613 and 623 respectively. The system receives input illumination from a light source 605. The light from light source 605 propagates along a first optical axis 601 and is incident upon polarizing element 603. Polarized light reflected by polarizing element 603 propagates along a second optical axis 602 arriving at a first dichroic mirror 610 at non-normal incidence. First dichroic mirror 610 selectively reflects light of wavelengths corresponding to a first color channel towards a first spatial light modulator 631. The light transmitted by the first dichroic mirror 610 illuminates the second dichroic mirror 620. The second dichroic mirror selectively reflects light of wavelengths corresponding to a second color channel towards a second spatial light modulator 632. That is, spatial light modulators 631 and 632 selectively reflect the incident light having wavelengths reflected by dichroic mirrors 610 and 620 to form blue and red color images respectively, while spatial light modulator 633 forms a green color image corresponding to wavelengths of light transmitted through both the first and second dichroic mirrors. These three color images are combined at polarizing element 603 after reflection by their respective spatial light modulators and transmitted to projection lens 650 for projection of the full color image onto viewing screen 660.

Waveplate retarder 640 is optically coupled to the second surface 623b of substrate 623, multi-layer optical interference coating 621 being disposed on the first surface 623a of substrate 623. Thus waveplate retarder 640 is tilted from normal incidence with respect to the second optical axis 602. Waveplate retarder 640 has a predetermined retardance value to compensate for the rotation and ellipticity induced by at least one of polarizing element 603 and dichroic mirrors 610 and 620 thereby increasing the contrast of the third, or green, color channel.

Figure 7:
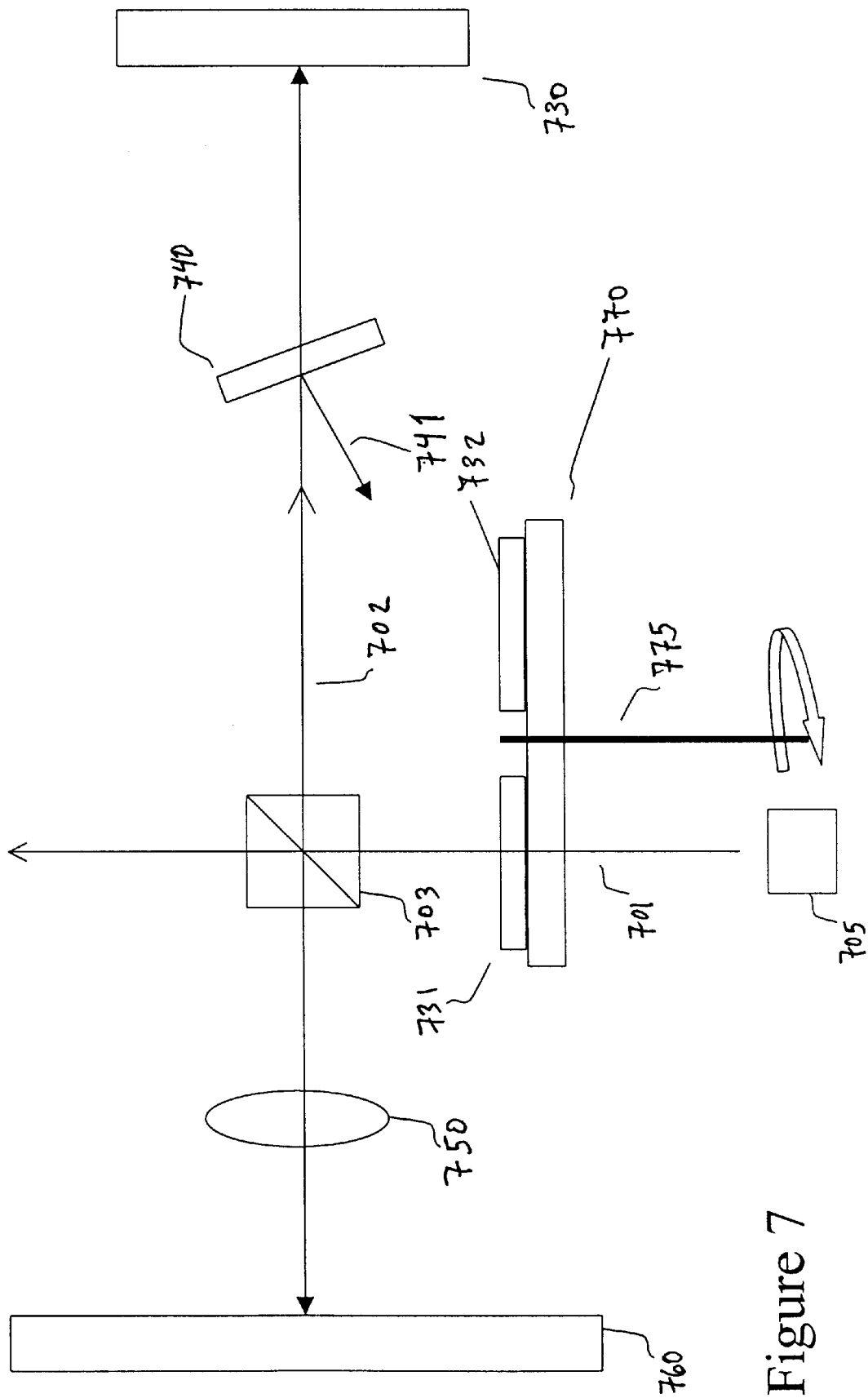
FIG. 7 is a schematic representation of a sixth embodiment of the reflective imaging system utilizing field sequential imaging via a single spatial light modulator and a color filter wheel comprising dichroic filters as the color separation element.

FIG. 7 illustrates an additional embodiment illustrating utility in a field sequential color imaging system. The illumination 705, polarization 703 and spatial light modulation 730, and projection elements 750 are arranged as depicted in FIG. 7 merely to illustrate the operative principles, and should not be construed as limiting. In a field sequential color imaging system the viewer perceives a continuous full color image over the entire viewing or image field via the rapid presentation of time sequential color images formed by a single spatial light modulator. The imaging system comprises a filter wheel 770 for mounting, supporting and time sequentially disposing each of at least three dichroic filters 731, 732, 733 between the polarizing element 703 and a single spatial light modulator 730. Dichroic filters 731, 732 and 733 are arranged in a radial sequence around the rotation axis 775 of filter wheel 770 such that rotation of color filter wheel 770 disposes each of the three dichroic filters across the first optical axis 701, whereby the color transmitted by the dichroic filter defines a wavelength range for each color in a repeating temporal sequence. A waveplate retarder 740 is tilted from normal incidence with respect to the second optic axis 702. Waveplate retarder 740 has a predetermined retardance value to compensate for the rotation and ellipticity induced by at least one of polarizing element 703 and dichroic mirrors 731, 732 and 733 thereby increasing the contrast of at least one color channel.

Figure 8:
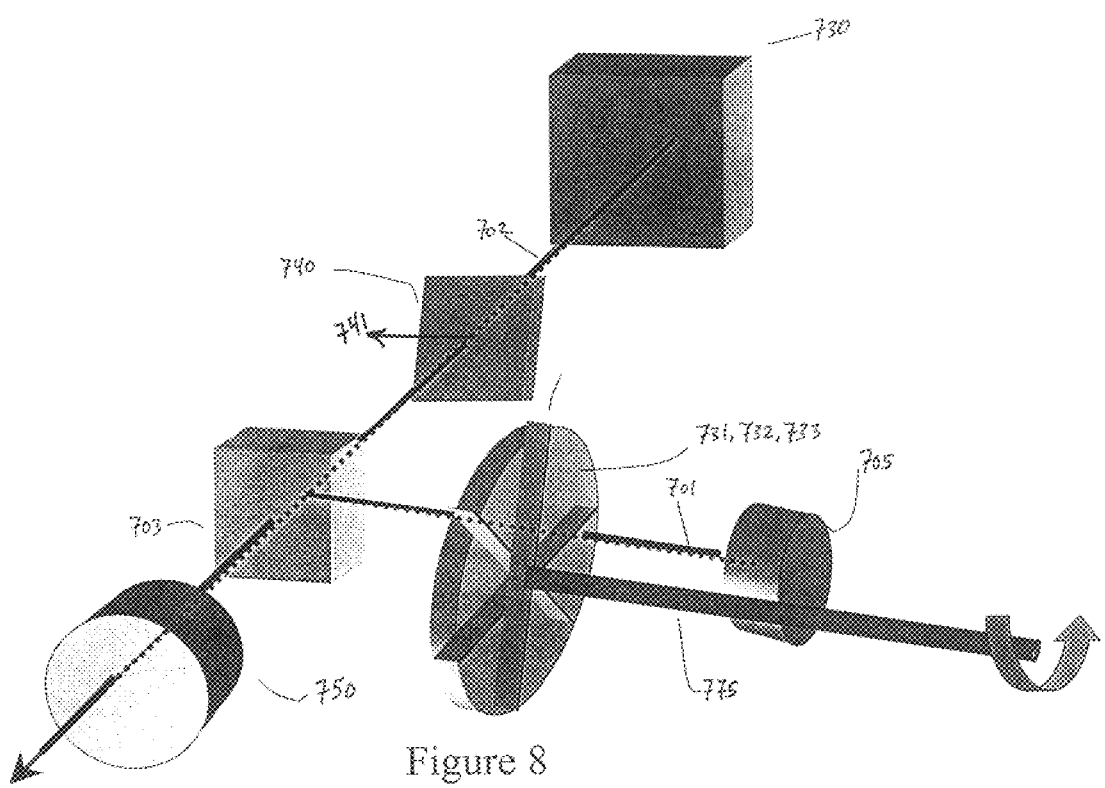
FIG. 8 is a perspective illustration of the reflective imaging system in FIG. 7, utilizing field sequential imaging via a single spatial light modulator and a color filter wheel.

FIG. 8 is a perspective illustration of the field sequential imaging system of FIG. 7. The color filter wheel 770 is preferably divided into six segments comprising three pairs of dichroic filters. Each pair of dichroic filters comprises a first dichroic filter disposed at 180 degrees with respect to rotation axis 775 from a second dichroic filter in which both dichroic have essentially the same spectral transmission characteristics. Each filter pair transmits light corresponding to wavelengths corresponding to the either the red, blue or green perceived color. It will be recognized by those having ordinary skill in the art that the dichroic filters can be of the absorbing or interference type as well as switchable filters, such as those described in U.S. Pat. Nos. 5,822,021 and 5,892,559; which are hereby incorporated by reference, and the like. That is the filter wheel can be replaced with any form of a time sequential color selective optical device.

EXAMPLE OF THE PREFERRED EMBODIMENT

This example of a preferred embodiment illustrates the construction of the prism corresponding to the green color channel as illustrated in FIG. 5. The waveplate retarder 120 has a retardance of 80 nm and is laminated to a glass plate 140, the glass plate having a thickness of 3 mm. The resulting waveplate and glass laminate is in turn attached or bonded directly onto prism G, thereby fixing the waveplate retarder 120 between the glass plate 140 and prism G. This assembly configuration and method fixes the angle of incidence of the second optical axis with respect to waveplate retarder 120 at about 10 degrees. Waveplate retarder 120 is effectively embedded within the color separation device, such as philips prism 32 in FIG. 4 which comprises prisms G, R and B. The thickness of prism G in the direction of the second optical axis is adjusted to accommodate the thickness of the waveplate, glass plate and any optical adhesive 160; the optical adhesive being utilized at one or more of the laminated interfaces between the waveplate 120, glass plate 140 and prism G.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be covered by United States Letters Patent is:

1. An image projection system, the projection system comprising:
   (a) a polarizing element,
   (b) a spatial light modulator for reflecting an image signal comprised of pixels selectively modulated in polarization state from the incident light arriving from said polarizing element,
   (c) a waveplate retarder disposed on the optical axis between said polarizing element and said spatial light modulator wherein said waveplate retarder is disposed such that the angle of incidence is greater than zero, whereby the Fresnel reflection from one or more surfaces of said waveplate retarder is directed away from the optical axis.

2. An image projection system according to claim 1 further comprising a color separation device.

3. An image projection system according to claim 2 wherein the color separation device is disposed between said spatial light modulator and said waveplate retarder.

4. An image projection system according to claim 2 wherein the color separation device is disposed between said polarizing element and said waveplate retarder.

5. An image projection system according claim 2 wherein said waveplate retarder is optically coupled to said color separation device.

6. An image projection system according claim 5 wherein said waveplate retarder is embedded within said color separation device.

7. An image projection system according to claim 2 wherein said color separation device is selected from the group consisting of an X-prism, tilted dichroic mirror, L-prism, Philips prism and modified plumbicon prism.

8. An image projection system according to claim 5 wherein said color separation device comprises an assembly of 2 or more triangular prisms.

9. An image projection system according to claim 8 wherein at least one of said triangular prisms has at least one surface where the associated color channel signal undergoes total internal reflection.

10. An image projection system according to claim 8 wherein said waveplate retarder has its plane disposed parallel to a facet of one of said triangular prisms.

11. An image projection system according to claim 8 wherein said waveplate retarder is disposed between a triangular prism and another prism.

12. An image projection system according to claim 4 wherein said waveplate retarder modifies the green color channel.

13. An image projection system according to claim 2 wherein said color separation device comprises at least one tilted dichroic mirror or at least one dichroic filter.

14. An image projection system according to claim 13 wherein said waveplate retarder is optically coupled to said tilted dichroic mirror.

15. An image projection system according to claim 1 wherein said waveplate retarder is optically coupled to said polarizing element.

16. An image projection system according to claim 1 wherein said polarizing element comprises an multiple layer interference structure.

17. A system as recited in claim 1, wherein said waveplate retarder is formed from a material selected from the group consisting of quartz, calcite, mica, organic polymeric plastics having different indices of refraction for different crystallographic axis, and a liquid crystal cell.

18. A process for improving the contrast of an image projection system, the process comprising:

(a) selecting an optical component having a phase control coating;
(b) determining the deviation of the phase change on reflection or transmission of the phase control coating from a target value;
(c) tilting a waveplate retarder a predetermined angle from a target angle to selectively correct for the measured deviation of the phase control coating.

19. A process for improving the contrast of an image projection system, wherein the image projection system further comprises a color separation device according to claim 18.

20. A process for improving the contrast of an image projection system according to claim 19 wherein the phase control coating is disposed on a surface of said color separation device.

21. A method of using a waveplate retarder in an image projection system which utilizes color splitting means for separating a polarized component of light into at least two separate color beams, the method comprising:

(a) identifying a desired retardance value at which an approximate minimum occurs for both ellipticity and elliptical polarization orientation of light as caused by polarization rotation of a portion of the light by a color splitting means in an image projection system, and
(b) providing a waveplate retarder having a retardance value which corresponds with the desired retardance value identified as resulting in an approximate minimum for both the ellipticity and elliptical polarization orientation of the light;

wherein said waveplate retarder is disposed on the optical axis at non-normal incidences between said polarizing element and said reflective imager whereby the Fresnel reflection from one or more surfaces of said wave plate retarder is directed away from the optical axis.

22. A method as recited in claim 21, wherein said providing step is achieved by (a) selecting a type of birefringent material to be used as the waveplate compensator,
(b) identifying an approximate thickness of the selected type of birefringent material which yields a retardance value corresponding with the desired retardance value, and
(c) providing the selected type of birefringent material with the identified thickness and in sizes appropriate for use as a waveplate retarder.

* * * * *